United States Patent

[11] 3,582,867

| [72] | Inventors | Wayne R. Thompson<br>Bainbridge;<br>Le Roy W. Fairbairn, Sidney, both of, N.Y. |
|---|---|---|
| [21] | Appl. No. | 808,775 |
| [22] | Filed | Mar. 20, 1969 |
| [45] | Patented | June 1, 1971 |
| [73] | Assignee | The Bendix Corporation |

[54] POLARIZATION MEANS FOR ELECTRICAL CONNECTORS
6 Claims, 10 Drawing Figs.

[52] U.S. Cl. ................................................ 339/92, 339/184
[51] Int. Cl. ...........................................H01r 13/54, H01r 13/64
[50] Field of Search ........................................ 339/184, 186, 221, 92

[56] References Cited
UNITED STATES PATENTS
| 3,120,417 | 2/1964 | Francis ........................ | 339/93 |
| 3,177,461 | 4/1965 | Hagen et al. .................. | 339/184(M) |
| 3,325,771 | 6/1967 | Ruehlemann et al. ........ | 339/184(M) |
| 3,426,315 | 2/1969 | De Tar ......................... | 339/105 |

*Primary Examiner*—Marvin A. Champion
*Assistant Examiner*—Lawrence J. Staab
*Attorneys*—Dale A. Bauer, John L. Weymour, Bauer and Seymour and Plante, Arens, Hartz, Hix and Smith ABSTRACT: Polarizing means for the main parts of a separable electrical connector which carry mating electrical contacts. The polarizing means has two polarizing inserts removably mounted in selected angular positions on the respective connector parts, such inserts having portions which interfit to permit the connector parts to be mated only when the correct connector parts are presented to each other. In the embodiments shown, the polarizing inserts are made of yieldable plastic material, and are of such dimensions as to provide sufficient tolerances to prevent binding between them when the correct connector parts are mated.

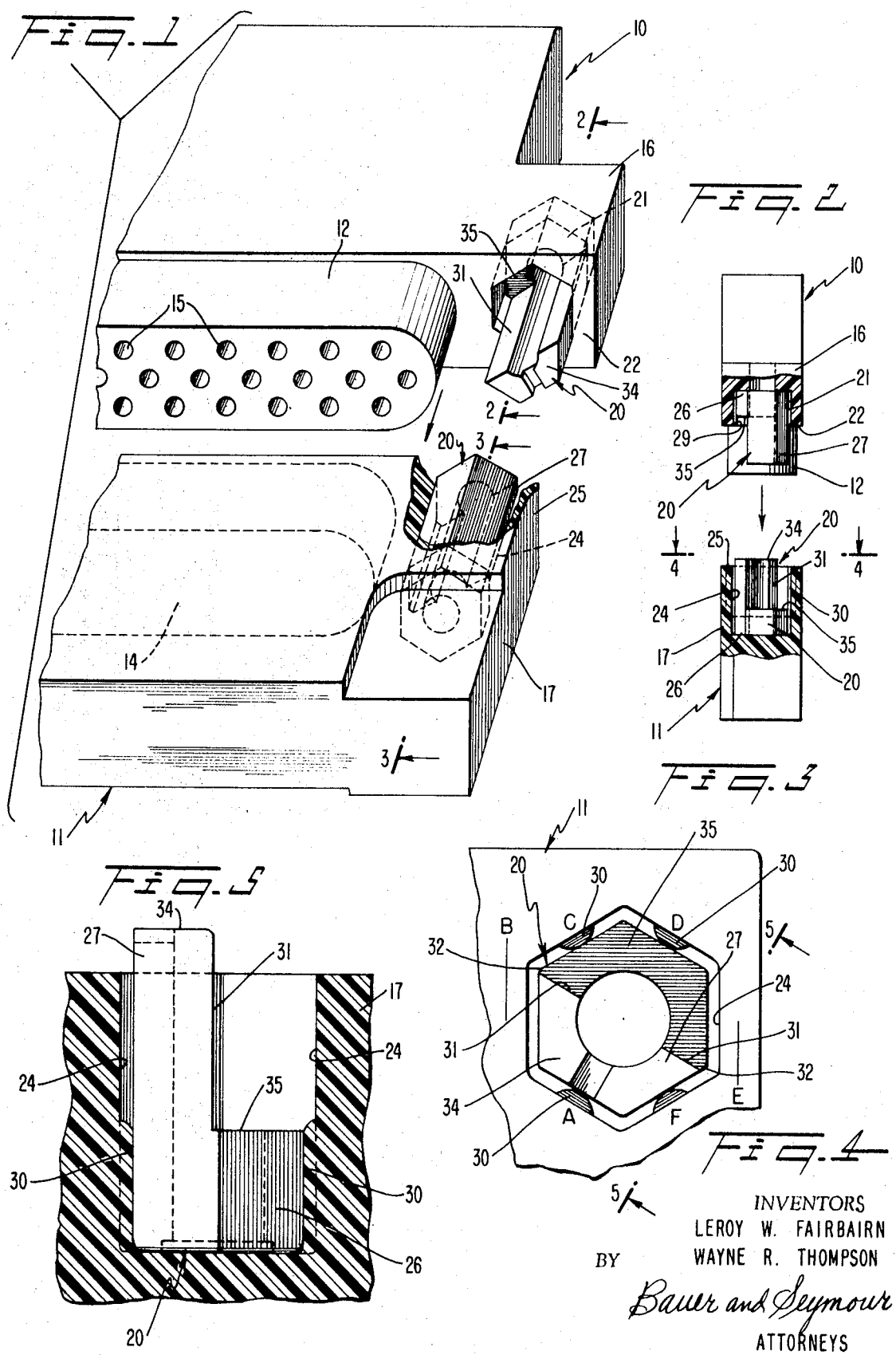

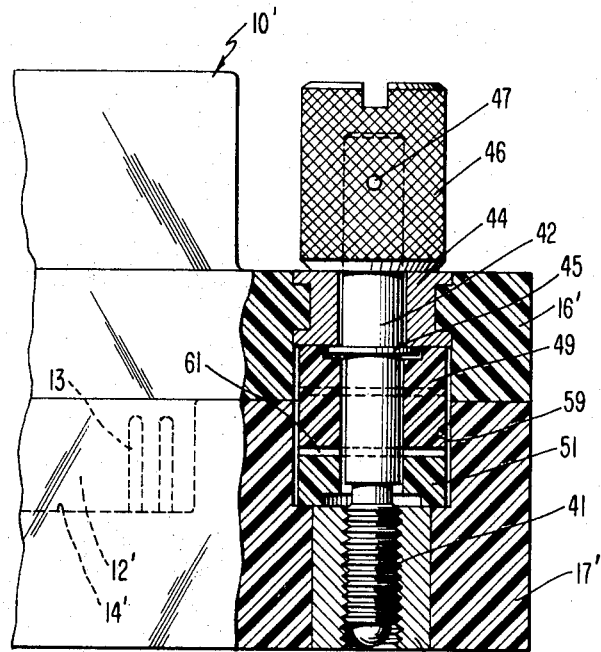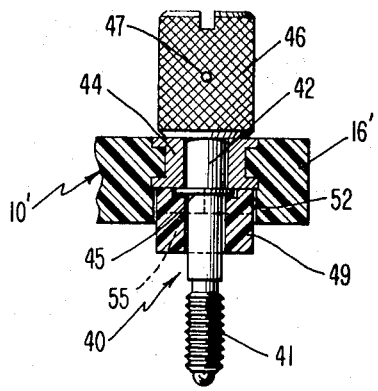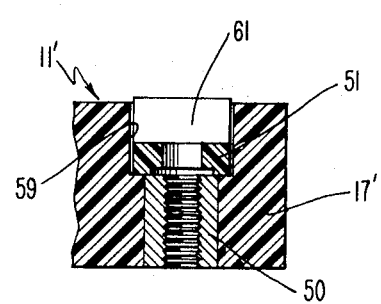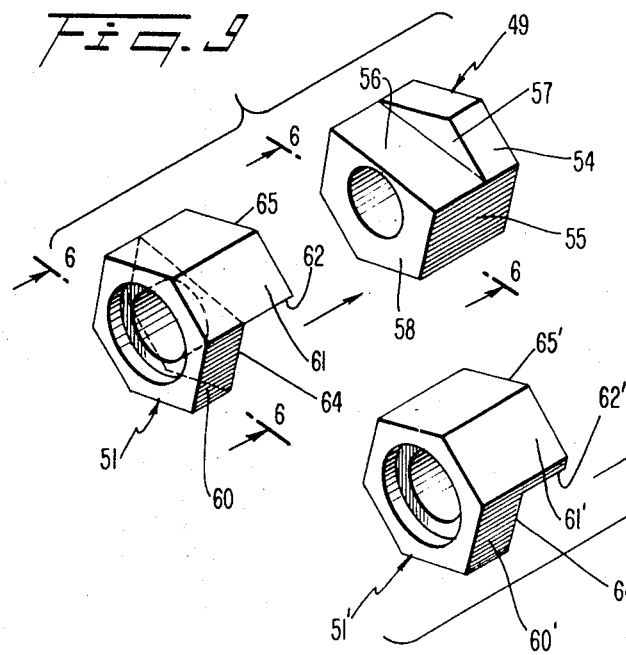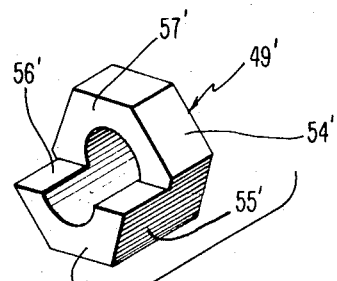

3,582,867

POLARIZATION MEANS FOR ELECTRICAL CONNECTORS

This invention relates to separable electrical connectors, and more specifically relates to polarizing means for the main parts of such connectors.

Among the objects of the invention is the provision of a novel polarizing means for the parts of a separable electrical connector.

Another object of the invention is the provision of a polarizing means which is readily adjusted to a plurality of different polarizing positions.

A further object of the invention is the provision of a polarizing means having mating polarizing inserts arranged for indexing upon the respective connector parts, the inserts being securely retained in each of their indexed positions.

Yet another object of the invention is the provision of a polarizing means wherein the parts thereof are resiliently yieldable and are made with such tolerances as to obviate binding between the connector parts and their polarizing inserts as the connector parts are mated.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a fragmentary view in perspective of a separable electrical connector with the two parts or bodies thereof aligned and about to be mated, such connector being provided with a first embodiment of polarizing means in accordance with the invention, a portion of the lower body of the connector being broken away to show the respective part of the polarizing means;

FIG. 2 is a view in vertical transverse section through the upper body of the connector of FIG. 1, certain of the parts being shown in elevation, the section being taken along the line 2—2 of FIG. 1;

FIG. 3 is a view in vertical transverse section through the lower body of the connector of FIG. 1, certain of the parts being shown in elevation, the section being taken along the line 3—3 of FIG. 1;

FIG. 4 is a view in plan of the portion of the connector part shown in FIG. 3, the view being taken from the line 4—4 of FIG. 3;

FIG. 5 is a view in vertical section through the connector body shown in FIGS. 3 and 4, the section being taken along the line 5—5 of FIG. 4;

FIG. 6 is a fragmentary view partially in side elevation and partially in longitudinal vertical section of a separable electrical connector with the two parts or bodies thereof in fully mated position, the section being taken along lines 6—6 of the polarizing means of FIG. 9, such connector being provided with a second embodiment of polarizing means in accordance with the invention;

FIG. 7 is a view on a reduced scale of the sectional portion of the upper connector body of FIG. 6, certain of the parts being shown in elevation;

FIG. 8 is a view on a reduced scale of the sectional portion of the lower connector body of FIG. 6;

FIG. 9 is a view in perspective of the parts of the polarizing means of the connector of FIGS. 6—8, inclusive, in aligned spaced relationship; and FIG. 10 is a view similar to FIG. 9 of another embodiment of polarizing means useful in the connector of FIGS. 6—8, inclusive.

Separable electrical connectors of the type shown herein are frequently employed, as in computer and control installations. Frequently many such connectors are used, the connector bodies of one type being stacked and mounted on a panel whereas the connector bodies of the other type, which are connected to respective flexible cables, are selectively mated with the respective ones of the fixedly mounted connector bodies. Unless the connector bodies are correctly mated, malfunctioning of the apparatus will result; the apparatus may also be severely damaged or ruined.

The connector polarizing means in accordance with the invention makes it possible to make all of the connectors per se of the same construction, thereby permitting their economical production and stocking. The polarizing means in accordance with the invention includes pluglike parts which are received in aligned seats in the connector bodies, the seats and the pluglike parts being of such shape that the parts can be disposed in any one of a number of different angular positions in the seat. The outer end portions of such parts are of such configuration that they are mateable, when the connector bodies are aligned and moved toward each other, only when the two parts of the polarizing means are correctly oriented relative to each other. When such parts are not correctly oriented relative to each other, they interfere and prevent the mating of the connector bodies.

Turning now to the first embodiment of electrical connector shown in FIGS. 1—5, inclusive, of the drawings, the connector there shown has a plug body 10 and a receptacle 11, the body 10 having a projecting portion 12 thereon which is receivable in a recess 14 in body 11. Portion 12 has a plurality of spaced bores 15 therethrough which receive socket contacts, not shown. A plurality of pin contacts, also not shown, mounted on the blind end wall of recess 14, are disposed to be received within the sockets when the connector bodies are fully mated. In the installation herein described, the connector plug 10 is secured to a chassis panel whereas the connector receptacle 11 is secured to a flexible cable or to a printed circuit board.

Outwardly beyond the ends of portion 12 of body 10 there are ears of which one is shown at 16 in FIG. 1. The body 11 has two end portions beyond the outer ends of recess 14, one such end portion being shown at 17. When bodies 10 and 11 are mated, the ears 16 are disposed in alignment with the end portions 17. Mounted in each of the ear 16 and the end portion 17 is a part 20 of a connector polarizing means. In this embodiment such two parts are identical, but are so mounted in the connector bodies that a large portion of the part 20 in body 10 extends outwardly beyond the surface 22 of body 10, but somewhat rearwardly of the forward surface of the part 12, whereas a relatively small portion of the part 20 in body 11 extends outwardly beyond the surface 25 of body 11. Parts 20 are made of resiliently yieldable plastic material such as nylon.

The part 20 is in the form of a hexagonal rod having a hexagonal base portion 26 from one side of which there rises a stem 27 which has a height substantially greater than the height of the portion 26. The stem 27 is, in effect, formed as somewhat less than one-half the section of the outer portion of part 20, the cutting plane extending substantially between opposite corners of the hexagonal rod. One part 20 is selectively mounted in a desired angular position on body 10 by being snapped into a relatively short hexagonal seat 21 in the body 10; the other part 20 is selectively mounted in a desired angular position on body 11 by being snapped into a relatively long hexagonal seat 24 in a desired angular position in body 11. When bodies 10 and 11 are aligned as shown the hexagonal seats 21, 24 are similarly oriented and, in effect, form prolongations of each other.

It will be apparent that the hexagonal polarizing parts 20 permit any one of six different manners of polarization of the connector bodies 10, 11 to be chosen. If similar mating polarizing parts 20 are also used in the ear and end portion at the other end of the bodies, a total of 36 different manners of polarization are possible. It is obvious that the parts 20 may have sections of other polygonal configurations, with more or less than six sides.

The polarizing parts 20 are securely but removably retained in their respective seats 21, 24 by means which grip the base portions 26 of the parts 20 but leave the stems 27 thereof unencumbered and free for limited flexing. On two sets of opposing surfaces of the seat 24 there are disposed ribs 30 which compressively engage the base 26 of parts 20. Ribs 30 extend from the bottom of seat 24 to about the outer surface 35 of base 26 when part 20 is seated as shown in FIGS. 3—5, inclusive. Similarly, on two sets of opposing surfaces of the seat 21 there are disposed ribs 29 which extend from the bottom of seat 21 to about the level of the outer surface of base 26 as shown in FIG. 2.

When the polarizing parts 20 are fully mated, under normal conditions the outer end surfaces 34 of stems 27 of such parts are appreciably spaced from each other, as are the confronting faces 31 of the opposed stems 27. The seats 21, 24 have dimensions which substantially exceed those of the polarizing parts 20, as shown in FIG. 4. As a result, the stems 27 of the parts 20 not only are free to enter the opposing seats, but are free to yield resiliently to permit the connector parts 10, 11 to be mated, if necessary. The stems 27 are sufficiently thick, however, and are sufficiently rigid securely to prevent the mating of connector bodies the polarizing parts 20 of which are incorrectly oriented.

In the second disclosed embodiment of the invention, shown in FIGS. 6—10, inclusive, parts which are the same as in FIGS. 1—5, inclusive, are designated by the same reference characters with an added prime. In this embodiment, schematically shown contact pins mounted on the bottom wall of recess 14' are designated 13 in FIG. 6.

In the second disclosed embodiment, the connector bodies 10' and 11' are connected by screws 40, of which one is shown in FIGS. 6 and 7. Screw 40 has a lower threaded end 41 above which the stem 42 is of circular cylindrical configuration. The screw 40 is held captive by means of an insert collar 44 which is molded into the end portion 16' of the body 10', there being an annular flange 45 on the stem 42 and disposed below the collar 44 and a thumb knob 46 affixed to the upper end of the stem above the collar by a cross pin 47. A polarizing insert part 49 is pressed into a seat in portion 16', part 49 having a bore therethrough receiving the stem 42 of the screw 40.

A nut 50 is molded into the part 17' of the connector body 11', as shown more clearly in FIG. 8. The nut 50 receives the threaded portion 41 of the screw 40 so as to hold the two connector bodies 10' and 11' together when they are fully mated as shown in FIG. 6. A polarizing insert part 51 is disposed in a seat in alignment with the nut 50, the part 51 having a protruding portion which mates with a protruding portion of member 49 so as to prevent the mismating of the plug and receptacle parts of the connector. In the embodiment shown, the polarizing parts 49 and 51 are of regular polygonal cross section, as shown more clearly in FIG. 9. The part 49 is snugly but removably mounted in a hexagonal seat 52 in the part 16' of the connector body 10'. Part 49 has a base portion 54 of full section, the part being in effect cut back between two alternate corners to form the protruding portion 55 of part 49. The axially extending side face of portion 55 is designated 56, the axially outer end surface of the base 54 being designated 57.

The other, mating polarizing part 51 is snugly received in a hexagonal seat 59 in the part 17' of the body 11'. As is shown more clearly in FIG. 9, the part 51 has a base portion 60, the remainder of the part having been cut back in an axial direction to yield a portion 61 which is, in effect, complementary to the portion 55 of part 49. The portions 55 and 61 of the parts 49 and 51 are so dimensioned that the axially extending face 56 of part 49 and the axially extending face 62 of part 51 fit together with appreciable spacing between them when the parts are mated as shown in FIG. 6. The parts 49 and 51 have the base portions and the cut back portions thereof of such lengths that the surface 58 is appreciably spaced from the surface 64 and the surface 57 is similarly spaced from the surface 65 when the connector parts are fully mated. Such construction, as in the first disclosed embodiment, permits the polarizing parts 49 and 51 to be mated without imposing any undesirable sidewardly directed forces upon the pin and socket contacts of the connector.

In FIG. 10 there is shown another embodiment of mating polarizing parts which may be employed in the connector shown in FIG. 6. Parts in FIG. 10 which are the same as those in FIGS. 6—9, inclusive, are designated by the same reference characters with an added prime. The parts shown in FIG. 10 differ from those in FIG. 9 as to the location of the "cut" which produced the two protruding mating portions of the polarizing parts. Whereas in FIG. 9, the plane of cut extends between two alternate corners of the hexagon, in FIG. 10 the cut is made slightly rearwardly of the axial plane between opposite corners of the hexagon. Thus, in the construction of FIG. 10, the polarizing parts 49' and 51' are of identical construction.

When the polarizing parts are identical, as in the first disclosed embodiment and in that of FIG. 10, the polarizing means is desirably simplified. In the first embodiment, the polarizing parts 20 partially protrude from between connector bodies and so can be removed manually and replaced in a different angular position if desired. The polarizing parts 20 are securely held on the respective connector bodies at the bases of such parts, the protruding stems 27 thereof being free to flex if necessary, should it engage the stem of the other part 20, the wall of the opposing seat, or both. Thus, the polarizing means does not impose any undesirable strain upon the mating contacts of the connector. The polarizing means is compact and adds little, if anything, to the bulk of the connector bodies. In simple installations, as where only one connector is used, it is not necessary to mount the polarizing parts 20, parts 49, 51, or parts 49', 51', upon the connector bodies.

The embodiments of FIGS. 6—10, inclusive, are more adapted to one final assembly of the polarizing means than that of FIGS. 1—5, inclusive. However, the polarizing parts 49, 51 and 49', 51' may, if desired, be removed and reinserted on location if necessary, the part 51 being withdrawn from its seat by an appropriate tool.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

Although the polarizing parts or inserts 20 of the first disclosed embodiment and the parts 49, 51, 49', 51' of the second and third disclosed embodiments are disclosed as being of regular polygonal section, they can be made of other shapes. Thus the inserts and the seats which receive them may be of any multisided cross-sectional shapes such that the opposing inserts may be securely retained in any one of a number of complementary, mating positions. In the embodiment of FIGS. 6—8, inclusive, the passages in the plug body and receptacle may, if desired, be provided with ribs therein similar to the ribs 29 and 30 in the embodiment of FIGS. 1—5, inclusive.

The embodiments of the invention in which an exclusive property or privilege I claim are defined as follows:

1. In a separable electrical connector including bodies carrying mateable contacts the improvement which comprises at least one connector-body polarizing means, said polarizing means including two parts of relatively rigid, though slightly resilient material, each of which is mounted on a respective connector body and is in the form of a rod having a base portion of multisided transverse section and a stem portion projecting longitudinally from the base portion, recesses in the connector bodies which confront and register with each other when the contacts are mated, the recesses having multisided transverse sections corresponding to but somewhat larger than the transverse sections of said base portions of the rods with inwardly extending projections on the walls of the recesses around said base portions for compressively engaging the sides of the latter to center the same in the recesses, hold the same against appreciable angular movement in the recesses and yieldably resist axial movement of the same in the recesses, whereby each recess receives and yieldably retains a said part in any one of a number of angular positions, the stem portion of each said part being so constructed and arranged that the connector bodies are mateable only when such parts are in complementary angular positions in their respective connector bodies.

2. An electrical connector as defined in claim 1 wherein the base portions of said two parts of the polarizing means have longitudinal openings therethrough, whereby the resiliency of the same in response to the compressive action of said projections is enhanced.

3. An electrical connector as defined in claim 2 comprising means for securing the connector bodies together with the contacts and polarizing parts in mated relation, including an internally threaded nut fixedly captured in one said body in axial alignment with said recesses and a bolt rotatably captured in the other said body and extending through said polarizing parts into threaded engagement with said nut.

4. An electrical connector as claimed in claim 1 wherein the said two parts of the polarizing means are of substantially the same size and shape.

5. An electrical connector as claimed in claim 1 wherein said projections are axially extending ribs on pairs of opposite walls of the recesses, said ribs compressively engaging the base portions of the said parts between them.

6. An electrical connector as defined in claim 5 wherein said ribs are centrally disposed on the sidewalls of the recesses and centrally engage sidewalls of said base portions of the polarizing parts.